United States Patent Office 3,120,532
Patented Feb. 4, 1964

3,120,532
OXIDATION OF AN ALLO-YOHIMBINE COMPOUND TO A 3-DEHYDRO-YOHIMBENE COMPOUND
Robert Armistead Lucas, Mendham, Harold Belding MacPhillamy, Madison, and Michael Mullen Robison, Berkeley Heights, N.J., assignors to Ciba Corporation, a corporation of Delaware
No Drawing. Filed Sept. 22, 1961, Ser. No. 139,884
9 Claims. (Cl. 260—287)

The present invention concerns process for the oxidative introduction of a double bond. More especially, it relates to the conversion of a compound having the 1,3α,5,6,14,15,16,17,18,19,20,21 - dodecahydro-benz[g]indolo[2,3-a]-quinolizine ring system of the formula

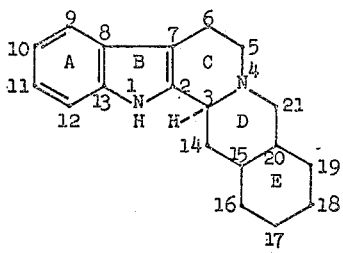

into the 3(14)-dehydro-derivatives thereof having the ring system of the formula

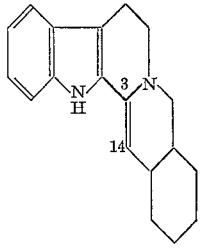

i.e. the 1,5,6,15,16,17,18,19,20,21-decahydro-benz[g]indolo[2,3-a]quinolizine ring system, or salts of such compounds, in which the double bond extends from the 3-position to the 4-position, and which have the ring system of the formula

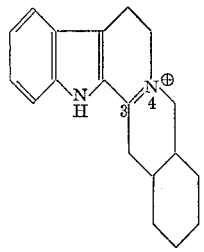

which ring system is also present, whenever the free 3(14)-dehydro compound is dissolved in a polar solvent.

The 1,3β,5,6,14,15,16,17,18,19,20,21-dodecahydrobenz-[g]indolo[2,3-a]quinolizine ring system of the formula

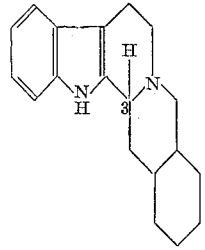

is common to a number of pharmacologically active compounds or important intermediates.

For example, 18-hydroxy-1,3β,5,6,14,15α,16α,17,18,19,20α,21dodecahydro-benz[g]indolo[2,3-a]quinolizine 16β-carboxylic acid compounds, i.e. 18-hydroxy-3-epi-allo-yohimbane 16β-carboxylic acid compounds, having the ring system of the formula

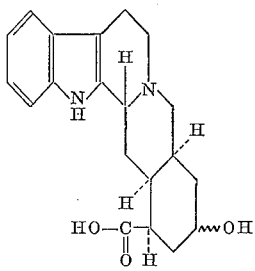

or monoesters, diesters, monoethers or monoester-monoethers thereof, are especially useful as pharmacologically effective compounds or intermediates for the preparation of the latter. For example, diesters of 18β-hydroxy-17α-R-3-epi-allo-yohimbane 16β-carboxylic acids, in which R stands primarily for lower alkoxy, as well as hydrogen or cyano, particularly those, in which the 16β-carboxyl group is esterified with an aliphatic alcohol and the 18β-hydroxyl group is esterified by an organic carboxylic acid, and monoester-monoethers of 18-hydroxy-17α-R-3-epi-alloyohimbane 16β-carboxylic acids, in which the 16β-carboxyl group is esterified with an aliphatic alcohol, and the 18-hydroxyl group (having either the α-configuration or the β-configuration) is etherified with an aliphatic alcohol, have antihypertensive, sedative and/or antifibrillatory effects and are used accordingly. The corresponding free acids, the monoesters, the monoethers and certain diesters, particularly those in which the 18-hydroxyl group (having either the α- or the β-configuration) is esterified wth an organic sulfonic acid or a hydrohalic acid, are important intermediates in the manufacture of the pharmacologically active compounds.

Useful intermediates, having the 18-hydroxy-3-epi-alloyohimbane 16β-carboxylic acid ring system, are, for example, 18-hydroxy-17α-R-3-epi-allo-yohimbane 16β-carboxylic acids, in which the 18-hydroxyl group may have either the α-configuration or the β-configuration, and R has the previously-given meaning, e.g. reserpic acid, deserpidic acid, 18-epi-reserpic acid and the like, 18-hydroxy-17α-R-3-epi-allo-yohimbane 16β-carboxylic acid esters, in which the 18-hydroxyl group may have either the α-configuration or the β-configuration, R has the previously-given meaning, and the 16β-carboxyl group is esterified with an aliphatic alcohol, particularly a lower alkanol, e.g. lower alkyl reserpates, lower alkoxy-lower alkyl reserpates, lower alkyl deserpidates, lower alkyl 18-epi-reserpates, lower alkoxy-lower alkyl 18-epi-reserpates and the like, or 18 organic sulfonyloxy-17α-R-3-epi-allo-yohimbane 16β-carboxylic acid esters, in which the 18-organic sulfonyloxy group has either the α-configuration or the β-configuration, R has the previously-given meaning, and the 16β-carboxyl group is esterified with an aliphatic alcohol, particularly a lower alkanol, e.g. lower alkyl 18-O-organic sulfonyl-reserpates, lower alkoxy-lower alkyl 18-O-organic sulfonyl-reserpates, lower alkyl 18-epi-O-organic sulfonyl-reserpates, lower alkoxy-lower alkyl 18-epi-O-organic sulfonyl-reserpates and the like. Pharmacologically useful compounds, which may be prepared from such intermediates according to known methods, are, for example, 18β-organic carbonyloxy-17α-R-epi-alloyohimbane 16β-carboxylic acid esters, e.g. esters of lower alkyl reserpates and lower alkyl deserpidates with monocyclic carbocyclic aryl carboxylic acids or monocyclic carbocyclic aryl-lower aliphatic carboxylic acids, e.g. reserpine, syrosingopine, deserpidine, rescinnamine and the like, or 18-etherified hydroxy-17α-R-3-epi-allo-yohimbane 16β-carboxylic acid esters, in which the 18-etherified hydroxyl group (having either the α-configuration or the β-configuration) is etherified with an aliphatic alcohol, particularly a lower alkanol, R has the previously-given meaning, and the 16β-carboxyl group is esterified with an aliphatic alcohol, particularly a lower alkanol, e.g. lower alkyl 18-O-lower alkyl reserpates, lower alkyl 18-epi-O-lower alkyl-reserpates, lower alkoxy-lower alkyl 18-epi-O-lower alkoxy-lower alkyl-reserpates and the like.

Compounds having the 1,3β,5,6,14,15,16,17,18,19,20,21-dodecahydro-benz[g]indolo[2,3-a]quinolizine ring system, especially compounds of the 18-hydroxy-1,3β,5,6,14,15α,16α,17,18,19,20α,21 - dodecahydro - benz[g]indolo[2,3-a]quinolizine 16β-carboxylic acid or 18-hydroxy-3-epi-allo-yohimbane 16β-carboxylic acid series, may be prepared, for example, by extracting plant material (roots, barks, seeds and the like) from certain plants of the Apocynacea family, such as those of the genus Rauwolfia, e.g. *Rauwolfia serpentina, Rauwolfia vomitoria, Rauwolfia inebrians, Rauwolfia tetraphylla, Rauwolfia canescens, Rauwolfia hirsuta* and the like, Tondusia, e.g. *Tondusia longifolia* and the like, or Alstonia, e.g. *Alstonia constricta* and the like, which contain alkaloids having the above-mentioned ring systems, such as reserpine, rescinnamine, deserpidine and the like. These alkaloids may be used per se or may be converted into suitable starting materials and intermediates, from which other pharmacologically useful products can be derived.

In view of the fact that dependency on natural sources foreign to main manufacturing areas always presents problems of adequate supply, the total synthesis of the natural alkaloids or analogs thereof, using readily available starting materials, is important and highly desirable. Woodward et al., J. Am. Chem. Soc., vol. 78, p. 2023 (1956) has described the total synthesis of reserpine which, upon completion of minor modifications, has proven to be well-suited for the preparation of the natural alkaloid and analogs thereof, having pharmacological properties or serving as intermediates. A key intermediate in the specific synthesis of Woodward et al. is a salt of methyl 18-O-acetyl-3(4)-dehydro-reserpate, which may be converted into the free base, i.e. methyl 18-O-acetyl-3(14)-dehydro-reserpate, by treatment with ammonia; this salt is formed by ring closure of methyl 18-O-acetyl-2,3-seco-reserpate with an acidic reagent, e.g. phosphorus oxychloride. Removal of the double bond extending from the 3-position represents a major problem, because reduction can lead to the formation of two isomeric substances, of which the one with the more stable configuration, i.e. methyl 18-O-acetyl-3-iso-reserpate, represents at least a major by-product, if not the major product of the reduction. Woodward et al., in completing the synthesis, treats the methyl 18-O-acetyl-3-dehydro-reserpate salt with sodium borohydride to form exclusively the more stable methyl 18-O-acetyl-3-iso-reserpate; upon total hydrolysis to 3-iso-reserpic acid, lactone formation, epimerization by treatment with pivalic acid and subsequent re-esterification, this compound is transformed into the desired reserpine or an analog thereof.

In view of this rather lengthy procedure, which, above all, involves total hydrolysis of a diester intermediate and reesterification of a hydroxy-acid to a diester, ways and means have been explored to (*a*) reduce a 3-dehydro-derivative to the compound having the desired 3β-configuration, or (*b*) directly convert a resulting compound having the more stable α-configuration into compounds having the desired β-configuration at the 3-position.

Direct reduction (variation *a*) of compounds having the 1,5,6,15α,16α,17,18,19,20α,21 - decahydro-benz[g]indolo[2,3-a]quinolizine structure, or salts thereof, has been described by Weisenborn et al., J. Am. Chem. Soc., vol. 78, p. 2022 (1956); these authors treat a Δ³-allo-yohimbene compound with zinc in 50 percent aqueous acetic acid to form a mixture of the desired 3-epi-allo-yohimbane and the isomeric allo-yohimbane compound, the latter having the 3α-configuration and being the main product of such reduction. A more advantageous precedure, described by Bardoneschi et al., U.S. Patent No. 2,924,600, involves treatment of the solution of a Δ³-allo-yohimbene compound in a mixture of water and a water-miscible organic solvent with zinc in the presence of aqueous perchloric acid; according to this method up to 75 percent of the compound having the desired 3β-configuration is obtained, the by-product being mainly the corresponding compound having the 3α-configuration. It is, therefore, clear that, according to the known reducing procedures, substantial amounts of undesired product having the α-configuration in the 3-position of the 1,3α,5,6,14,15,16,17,18,19,20,21 - dodecahydro - benz[g]indolo[2,3-a]quinolizine ring system are obtained; the conversion of the by-product into a useful compound having the 3β-configuration is, therefore, desirable.

Direct conversion (variation *b*) of compounds having the 1,3α,5,6,14,15,16,17,18,19,20,21 - decahydro-benz[g]indolo[2,3-a]quinolizine structure into compounds, in which the hydrogen in the 3-positon has the β-configuration, for example, of an allo-yohimbane into a 3-epi-allo-yohimbane compound, has been reported. For example, by treating a compound of the allo-yohimbane series with a suitable acid, such as acetic acid and the like, according to the disclosure of U.S. Patent No 2,957,877, an equilibrium between the allo-yohimbane compound and the desired 3-epi-allo-yohimbane compound can be established, and the latter can be isolated from the equilibrium mixture. However, the yields obtained according to this procedure are not satisfactory, unless the recovered starting material is recycled several times, which tends to make the procedure lengthy and subject it to losses.

In view of the fact that compounds having the 1,3α,5,6,14,15,16,17,18,19,20,21 - dodecahydro - benz[g]indolo[2,3-a]quinolizine ring system, particularly those of the 18-hydroxy - 1,3α,5,6,14,15α,16α,17,18,19,20α,21-dodecahydro-benz[g]indolo[2,3-a]quinolizine 16β-carboxylic acid or 18-hydroxy-3-epi-allo-yohimbane 16β-carboxylic acid series, are easily prepared or are formed as major by-products in the preparation of compounds having 1,3β,5,6,14,15,16,17,18,19,20,21 - dodecahydro-benz[g]indolo[2,3-a]quinolizine ring system, conversion (or reconversion, in case they are formed during the reduction of a 3-dehydro-compound) of the former into the corresponding 3-dehydro-compounds, having the 1,5,6,15,16,17,18,19,20,21-decahydro-benz[g]indolo[2,3-a]quinolizine ring system, particularly into compounds of the 18-hydroxy-1,5,6,15α,16α,17,18,19,20α21 - decahydro - benz[g]indolo[2,3-a]quinolizine 16β-carboxylic acid or Δ³-18-hydroxy-allo-yohimbene 16β-carboxylic acid series, or salts thereof, and subjecting these 3-dehydro-compounds to one of the previously-mentioned procedures to form the compounds having the desired 1,3β,5,6,14,15,16,17,18,19,20,21-dodecahydro-benz[g]indolo[2,3-a]quinolizine ring system, therefore, appears to offer the most conventient method of utilizing the undesirable by-products of the total synthesis.

Several procedures dealing with this problem have been disclosed, but none of them offers completely satisfactory results. For example, Weisenborn et al., J. Am. Chem. Soc., vol. 78, p. 2022 (1956), described the use of mercuric acetate as an oxidation reagent; however, it is known that the work-up of mixture resulting from such mercuric acetate oxidation procedures are tedious, and, in order to completely remove all traces of mercury compounds, involve the use of poisonous hydrogen sulfide to precipitate mercuric sulfide. Furthermore, the resulting product is generally a mixture containing starting materials and products which have a higher degree of oxidation.

Gottfredsen et al., Acta Chem. Scand., vol. 10, p. 1414 (1956), suggest the use of tertiary butyl hypochlorite as the reagent to convert a yohimbane compound into its Δ³-yohimbene derivative; however, this reagent requires the use of organic diluents which, if possible, are avoided in manufacturing procedures in view of their volatility, inflammability and the like.

A recently disclosed procedure (U.S. Patent No. 2,957,000) involves refluxing a solution of a yohimbane compound in acetic acid in the presence of palladium black and in the atmosphere of an inert gas to form the Δ³-yohimbene compound. This procedure, again, is not very suitable for technical use; refluxing acetic acid and exclusion of air-oxygen require special equipment and, again, the reaction is carried out in a completely organic solvent. Obviously, the above-described procedures are unsatisfactory.

An object of the present invention is to provide a simple process for the conversion of compounds having the 1,3α,5,6,14,15,16,17,18,19,20,21 - dodecahydro - benz[g] indolo[2,3-a]quinolizine ring system into the corresponding dehydro compounds having a double bond extending from the 3-position, or salts thereof, which process does not require special equipment, is carried out in an aqueous medium and at room temperature, and proceeds in excellent yields.

Other objects and advantageous features thereof will become apparent as the description proceeds.

We have now found, that the oxidative introduction of a double bond extending from the 3-position into a compound having the 1,3α,5,6,14,15,16,17,18,19,20,21-dodecahydro-benz[g]indolo[2,3-a]quinolizine ring system to form the corresponding 3-dehydro-compound according to our invention is carried out by treating a compound having the 1,3α,5,6,14,15,16,17,18,19,20,21 - dodecahydrobenz[g]indolo[2,3-a]quinolizine ring system, or a salt thereof with an oxidation reagent containing hexavalent chromium, and, if desired, converting a resulting salt into a free compound, and/or, if desired, converting a resulting base into a salt thereof.

Preferred oxidation reagents containing hexavalent chromium are salts of chromic acid, such as alkali metal dichromates, particularly potassium dichromate and the like, as well as ammonium dichromate, or any other analogous salt containing the hexavalent chromium. Also useful as an oxidation reagent is chromic anhydride or any other suitable, analogous oxidation reagent of the above type. These reagents are advantageously used in the presence of an acid, especially acetic acid and the like, which may also serve as a diluent.

The reaction is carried out in an aqueous medium, preferably in a mixture of water and water-miscible organic solvents. The latter are diluents, which are not oxidized by the oxidation reagent; suitable solvents are, for example, tetrahydrofuran, p-dioxane, acetone and the like, but preferably acetic acid. The latter, when used as a diluent may also serve as an acidic reagent which may be required whenever the oxidation reagent is used in an unreactive form.

The reaction is carried out at room temperature, if necessary, while cooling.

Preferably, the oxidative introduction of the double bond into the starting material is carried out at room temperature using a salt of chromic acid, such as an alkali metal dichromate, especially potassium dichromate, as the oxidation reagent, in a mixture of water and a water-miscible organic solvent, especially in aqueous acetic acid.

The 3-dehydro-compound resulting from the above procedure is preferably isolated by neutralizing or basifying the reaction mixture, thus converting a resulting salt formed in the acidic reaction medium into the free base. Any water-soluble alkaline reagent may be used for that purpose; especially convenient is ammonia in the form of a concentrated aqueous solution thereof. Upon basifying the reaction mixture, the desired base may precipitate and be filtered off, or it may be extracted from the aqueous medium into an organic, sparingly water-miscible solvent, e.g. methylene chloride, chloroform, diethyl ether and the like, and thus be separated from the reaction mixture.

A resulting base may be converted into a salt thereof by treatment with an acid according to known methods, such as, for example, with inorganic acids, e.g. hydrochloric, hydrobromic, perchloric, nitric, thiocyanic, sulfuric, phosphoric acid and the like, or with organic acids, e.g. acetic, propionic, oxalic, malonic, succinic, maleic, hydroxymaleic, dihydroxymaleic, fumaric, malic, tartaric, citric acid and the like, or with organic sulfonic acids, e.g. methane sulfonic, ethane sulfonic, 2-hydroxyethane sulfonic, benzene sulfonic, p-toluene sulfonic acid and the like. Especially preferred salts are those, which are subsequently used in the reduction procedure for the conversion of the resulting 3-dehydro-compounds into the compounds having the 1,3β,5,6,14,15,16,17,18,19,20,21-dodecahydro-benz[g]indolo[2,3-a]quinolizine ring system; such salts are, particularly, the perchlorates, which may be prepared by treatment with perchloric acid.

In a resulting 3-dehydro-compound, the double bond extends from the 3-position to the 4-position, whenever said compound is present in the form of a salt thereof or whenever the free base is in solution with a polar solvent. It extends from the 3-position to the 14-position, whenever the 3-dehydro-compound is in the form of the free base or whenever the latter is in solution with a slightly polar to non-polar solvent.

Starting materials used in the procedure of this invention are particularly the compounds of the 18-hydroxy-1,3α,5,6,14,15α,16α,17,18,19,20α,21 - dodecahydro - benz [g]indolo[2,3-a]quinolizine 16β-carboxylic acid or 18-hydroxy-allo-yohimbane 16β-carboxylic acid series, having the formula

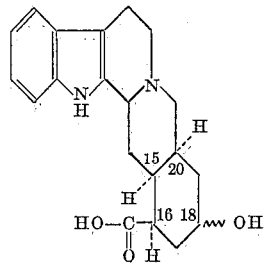

especially those of the 18-hydroxy-17α-R-allo-yohimbane 16β-carboxylic acid series, in which R has the previously-given meaning and stands primarily for lower alkoxy. The starting materials used in the above reaction are, therefore, 18 - hydroxy-allo-yohimbane 16β-carboxylic acids, the monoesters, monoethers, diesters and monoester-monoethers of such compounds, or salts thereof. These compounds may be illustrated by 18β-hydroxy-17α-lower alkoxy-allo-yohimbane 16β-carboxylic acids, 18α-hydroxy-17α-lower alkoxy-allo-yohimbane 16β-carboxylic acids, 18β-hydroxy-17α-lower alkoxy-allo-yohimbane 16β-carboxylic acid esters, 18α-hydroxy-17α-lower alkoxy-allo-yohimbane 16β-carboxylic acid esters, 18β-etherified hydroxy-17α-lower alkoxy-allo-yohimbane 16β-carboxylic acids, 18α-etherified hydroxy-17α-lower alkoxy-allo-yohimbane 16β-carboxylic acids, 18β-organic carbonyloxy-17α-lower alkoxy-allo-yohimbane 16β-carboxylic acid esters, 18α-organic carbonyloxy-17α-lower alkoxy-allo-yohimbane 16β-carboxylic acid esters, 18β-organic sulfonyloxy-17α-lower alkoxy-allo-yohimbane 16β-carboxylic acid esters, 18α-organic sulfonyloxy-17α-lower alkoxy-allo-yohimbane 16β-carboxylic acid esters, 18β-etherified hydroxy-17α-lower alkoxy-allo-yohimbane 16β-carboxylic acid esters or 18α-etherified hydroxy- 17α-lower alkoxy-allo-yohimbane 16β-carboxylic acid esters,
or acid addition salts of such compounds.

In these compounds, the 16β-carboxylic acid esters are primarily lower alkyl, e.g. methyl, ethyl, n-propyl, isopropyl, n-butyl and the like, esters, as well as lower alkoxy-lower alkyl esters, in which lower alkoxy is separated from the 16β-carboxyl group by at least two carbon atoms, such as 2-lower alkoxy-ethyl esters, e.g. 2-methoxyethyl, 2-ethoxyethyl and the like, as well as 2-lower alkoxy-2-methyl-ethyl, 3-lower alkoxy-lower alkyl esters and the like. Ethers of the 18-hydroxyl group are especially lower alkyl, e.g. methyl, ethyl, n-propyl, isopropyl, n-butyl, n-pentyl, n-hexyl and the like, ethers, as well as lower alkoxy-lower alkyl ethers, in which lower alkyl separates lower alkoxy from the 18-oxygen atom by at least two carbon atoms, such as 2-lower alkoxy-ethyl ethers, e.g. 2-methoxyethyl, 2-ethoxyethyl and the like, as well as 2-lower alkoxy-2-methyl-ethyl, 3-lower alkoxy-propyl ethers and the like. The organic carbonyl portion of any 18-organic carbonyloxy group is represented by the acyl radical of an organic carboxylic acid, such as a lower alkanoic acid, e.g. acetic, propionic, pivalic acid and the like, or, more particularly, a monocyclic carbocyclic aryl carboxylic acid, such as benzoic acid, lower alkyl-benzoic acid, e.g. 3,4,5-trimethyl-benzoic acid and the like, a hydroxy-benzoic acid, e.g. 4-hydroxy-benzoic acid and the like, a lower alkoxy-benzoic acid, e.g. 3,4-dimethoxy-benzoic, 3,4,5-trimethoxy-benzoic acid and the like, a lower alkyl-(lower alkoxy)-benzoic acid, e.g. 3,5-dimethyl-4-methoxy-benzoic acid and the like, a lower alkoxy-(lower alkoxy-carbonyloxy)-benzoic acid, e.g. O-ethoxy-carbonyl-syringic acid and the like, an N,N-di-lower alkyl-amino-benzoic acid, e.g. 3-N,N-dimethylamino-benzoic acid and the like, or a monocyclic carbocyclic aryl-lower alkanoic or a monocyclic carbocyclic aryl-lower alkenoic acid, e.g. 3,4,5-trimethoxy-dihydrocinnamic, 3,4,5-trimethoxycinnamic, O-ethoxycarbonyl-ferulic acid and the like, as well as the acyl radical of a monocyclic heterocyclic aryl carboxylic acid, e.g. nicotinic, isonicotinic, furoic acid and the like, or any other analogous carboxylic acid, used to furnish the acyl radical in an 18-esterified hydroxyl group of known yohimbane compounds. The organic sulfonyl portion of an 18-organic sulfonyloxy group represents the acyl radical of an aliphatic sulfonic acid, such as a lower alkane sulfonic acid, e.g. methane sulfonic, ethane sulfonic acid and the like, or, more especially, of a monocyclic carbocyclic aryl-sulfonic acid, e.g. benzene sulfonic, 4-bromo-benzene sulfonic, 3-nitro-benzene sulfonic, 4-nitro-benzene sulfonic, p-toluene sulfonic acid and the like.

More specific groups of compounds of the above type are the 3-iso-reserpic acid,
18-epi-3-iso-reserpic acid,
lower alkyl 3-iso-reserplates,
lower alkyl 18-epi-3-iso-reserpates,
18-O-lower alkyl-3-iso-reserpic acids,
18-epi-O-lower alkyl-3-iso-reserpic acids,
lower alkyl 18-O-lower alkanoyl-3-iso-reserpates,
lower alkyl 18-O-monocyclic carbocyclic aroyl 3-iso-reserpates,
loweralkyl 18-O-monocyclic carbocyclic aryl-lower alkenoyl-3-iso-reserpates,
lower alkyl 18-O-lower alkyl-sulfonyl-3-iso-reserpates,
lower alkyl 18-epi-O-lower alkyl-sulfonyl-3-iso-reserpates,
lower alkyl 18-O-monocyclic carbocyclic aryl-sulfonyl-3-iso-reserpates,
lower alkyl 18-epi-O-monocyclic carbocyclic aryl-sulfonyl-3-iso-reserpates,
lower alkyl 18-O-lower alkyl-3-iso-reserpates,
lower alkyl 18-epi-O-lower alkyl-3-iso-reserpates or analogous compounds of the 3-iso-reserpic and the 18-epi-reserpic acid series,
or acid addition salts thereof.

Other starting materials are the 3-iso-deserpidic acid, lower alkyl 3-iso-deserpidates,
lower alkyl 18-epi-3-iso-deserpidates,
18-O-lower alkyl-3-iso-deserpidic acids,
18-epi-O-lower alkyl-3-iso-deserpidic acids,
lower alkyl 18-O-lower alkanoyl-3-iso-deserpidates,
lower alkyl 18-O-monocyclic carbocyclic aroyl-3-iso-deserpidates,
lower alkyl 18-O-monocyclic carbocyclic aryl-lower alkenoyl-3-iso-deserpidates,
lower alkyl 18-O-lower alkyl-sulfonyl-3-iso-deserpidates,
lower alkyl 18-epi-O-lower alkyl-sulfonyl-3-iso-deserpidates,
lower alkyl 18-O-monocyclic carbocyclic aryl-sulfonyl-3-iso-deserpidates,
lower alkyl 18-epi-O-monocyclic carbocyclic aryl-sulfonyl-3-iso-deserpidates,
lower alkyl 18-O-lower alkyl-3-iso-deserpidates,
lower alkyl 18-epi-O-lower alkyl-3-iso-deserpidates and the like, or analogous compounds of the 3-iso-deserpidic and 18-epi-3-iso-deserpidic acid series, particularly those in which the 9-position, the 10-position, the 11-position and/or the 12-position are substituted by lower alkyl, e.g. methyl, ethyl and the like, lower alkoxy, e.g. methoxy, ethoxy, n-propyloxy, isopropyloxy and the like, lower alkylenedioxy, e.g. methylenedioxy, 1,1-ethylenedioxy and the like, lower alkyl-mercapto, e.g. methyl-mercapto, ethylmercapto and the like, halogeno, e.g. fluoro, chloro, bromo and the like, or any other suitable substituent, and/or in which the 5-position and/or the 6-position carries a lower alkyl, particularly methyl, group, and/or in which the 17α-methoxy group is replaced by another lower alkoxy, e.g. ethoxy, n-propyloxy, isopropyloxy and the like, group or by hydrogen, cyano or any other analogous group, or acid addition salts thereof.

Specific examples of such compounds are
3-iso-reserpic acid,
methyl 3-iso-reserpate,
ethyl 3-iso-reserpate,
n-propyl 3-iso-reserpate,
methyl 18-epi-3-iso-reserpate,
ethyl 18-epi-3-iso-reserpate,
n-propyl 18-epi-3-iso-reserpate,
18-O-methyl-3-iso-reserpic acid,
18-O-ethyl-3-iso-reserpic acid,
18-O-n-propyl-3-iso-reserpic acid,
18-epi-O-methyl-3-iso-reserpic acid,
18-epi-O-ethyl-3-iso-reserpic acid,
18-epi-O-n-propyl-3-iso-reserpic acid,
methyl 18-O-acetyl-3-iso-reserpate,
3-iso-reserpine,
3-iso-syrosingopine,
3-iso-rescinnamine,
methyl 18-O-methyl-sulfonyl-3-iso-reserpate,
methyl 18-epi-O-methyl-sulfonyl-3-iso-reserpate,
methyl 18-O-(4-bromo-phenyl-sulfonyl)-3-iso-reserpate,
methyl 18-O-(3-nitro-phenyl-sulfonyl)-3-iso-reserpate,
n-propyl 18-O-(3-nitro-phenyl-sulfonyl)-3-iso-reserpate,
ethyl 18-O-(4-nitro-phenyl-sulfonyl)-3-iso-reserpate,
methyl 18-epi-O-(4-bromo-phenyl-sulfonyl)-3-iso-reserpate,
methyl 18-epi-O-(3-nitro-phenyl-sulfonyl)-3-iso-reserpate,
n-propyl 18 - epi - O - (3-nitro-phenyl-sulfonyl)-3-iso-reserpate,
ethyl 18-epi-O-(4-nitro-phenyl-sulfonyl)-3-iso-reserpate,
methyl 18-O-methyl-3-iso-reserpate,
ethyl 18-O-ethyl-3-iso-reserpate,
methyl 18-epi-O-methyl-3-iso-reserpate,
methyl 18-epi-O-ethyl-3-iso-reserpate,
methyl 18-epi-O-n-propyl-3-iso-reserpate,
or similar monoesters, monoethers, diesters or monoester-monoethers of the 3-iso-reserpic or 18-epi-3-iso-reserpic acid type, or analogous monoesters, monoethers, diesters or monoester-monoethers of the 3-iso-deserpidic or 18-epi-3-iso-deserpidic acid series or analogous 3-iso-deserpidic or 18-epi-3-iso-deserpidic acids containing substituents attached to the 5-, 6-, 9-, 10-, 11- and/or 12-positions, as shown hereinbefore and/or having the 17α-methoxy group replaced by another lower alkoxy group, or by hydrogen, cyano and the like, or acid addition salts thereof.

Salts of the starting materials are acid addition salts, for example, the addition salts with the acid used in the reaction medium, e.g. acetic acid and the like, or any other suitable acid addition salts.

Free 18β-hydroxy-allo-yohimbane 16β-carboxylic acids, monoesters and diesters thereof, which are used as starting materials in the above oxidation reaction, are known or may be prepared according to known methods. Monoester-monoethers of such acids may be prepared, for example, by reacting corresponding acid esters with diazo-compounds in the presence of fluoboric acid; upon hydrolysis of the resulting monoester-monoethers, mono-ethers may be formed. 18α-hydroxy-allo-yohimbane 16β-carboxylic acids, esters and 18-ethers thereof may be manufactured, for example, by hydrolysis or alcoholysis of a suitable 18β-organic sulfonyloxy-allo-yohimbane 16β-carboxylic acid ester, preferably in the presence of N,N,N-triethylamine; from a resulting 18α-hydroxy-allo-yohimbane 16β-carboxylic acid ester the free acid or diesters and from the resulting monoester-monoethers the mono-ethers of the free acids may be prepared according to known or above-mentioned methods.

The invention also includes process for the formation of compounds having the 1,3β,5,6,14,15,16,17,18,19,20,21-dodecahydro-benz[g]indolo[2,3-b]quinolizine ring system, which comprises treating a compound having the 1,3α,5,6,14,15,16,17,18,19,20,21 - dodecahydro - benz[g]indolo[2,3-b]quinolizine ring system, or a salt thereof, with an oxidation reagent containing hexavalent chromium and removing in a resulting compound, having the 1,5,6,15,16,17,18,19,20,21 - decahydro - benz[g]indolo[2,3,-b]-quinolizine ring system, or a salt thereof, the double bond which extends from the 3-position by reduction, and, if desired, converting a resulting salt into the free compound, and/or, if desired, converting a resulting compound into a salt, an N-oxide or a salt of an N-oxide thereof.

The above oxidation reaction is carried out according to the previously-given procedure; potassium dichromate in aqueous acetic acid represents the preferred reagent. The removal of the double bond is carried out according to known methods, for example, by treatment with zinc in the presence of an acid or a mixture of acids, such as acetic acid and/or perchloric acid, using water and/or water-miscible organic solvents as diluents.

Salts, N-oxides or salts of N-oxides of resulting compounds are prepared according to known methods.

In the process of this invention such starting materials are preferably used which lead to final products mentioned in the beginning as preferred embodiments of the invention.

This is a continuation-in-part application of our application Serial No. 80,040, filed January 3, 1961 (now abandoned).

The following examples are intended to illustrate the invention and are not to be construed as being limitations thereon. Temperatures are given in degrees centigrade.

*Example 1*

To a solution of 0.5 g. of 3-iso-reserpine in 15 ml. of acetic acid is added a solution of 0.2 g. of potassium dichromate in 5 ml. of water; the reaction mixture darkens upon addition indicating immediate oxidation. After standing at room temperature for 1½ hours, an excess of water is added, and the dilute solution is made basic with concentrated aqueous ammonia. The organic material is extracted with methylene chloride, the organic extract is dried over sodium sulfate and evaporated to dryness. 0.47 g. of a residue is obtained, which consists of 3-dehydro-reserpine; paper chromatography of the reaction mixture shows the latter free from 3-iso-reserpine, used as the starting material. The free base is converted to the perchlorate, which melts at 215–218° after recrystallization from a mixture of methanol and isopropanol.

*Example 2*

To a mixture of 0.4 g. of 3-dehydro-reserpine perchlorate in 3.2 ml. of acetone, 1.6 ml. of water and 0.2 ml. of concentrated aqueous perchloric acid (density=1.61) is added 0.4 g. of zinc powder. The reaction mixture is refluxed for about twenty minutes while stirring and maintaining an atmosphere of nitrogen, and is then filtered hot. The solid material is washed with hot acetone; the combined filtrates are cooled and the desired reserpine perchlorate precipitates. Water is added while cooling to 5° and stirring; the solid material is filtered off, washed with water and dissolved in hot aqueous acetone. Concentrated ammonia is added to the warm solution and the desired reserpine precipitates and is purified by recrystallization according to known methods, M.P. 260–270° (decomposition).

*Example 3*

To a mixture of 1.0 g. of methyl 3-iso-reserpate in 20 ml. of acetic acid and 40 ml. of water is added a solution of 0.36 g. of potassium dichromate in 20 ml. of water. The reaction mixture is held at room temperature for one hour, is made basic with ammonia and extracted with methylene chloride, which extract is dried over magnesium sulfate and evaporated under reduced pressure. The desired methyl 3-dehydro-reserpate is crystallized and recrystallized from methylene chloride, M.P. 203–206°; $[\alpha]_D^{25} = +117°$ (chloroform).

The resulting methyl 3-dehydro-reserpate may be converted into methyl reserpate according to the procedure described in Example 2.

*Example 4*

To the mixture of 1.0 g. of methyl 18-epi-3-iso-reserpate in 20 ml. of acetic acid and 40 ml. of water is added 0.4 g. of potassium chromate in 20 ml. of water. The reaction mixture is allowed to stand at room temperature for one hour, 200 ml. of water is added, and the solution is made basic with ammonia. The desired methyl 3-dehydro-18-epi-reserpate is extracted with methylene chloride and worked up as shown in Example 3; it melts at 211–215° after crystallization from a mixture of methanol and water, and its $[\alpha]_D^{26°}$ is $+110°$ (chloroform).

In the above example, potassium dichromate may be replaced by ammonium dichromate, lithium dichromate, sodium dichromate, chromic anhydride and the like.

The resulting methyl 3-dehydro-18-epi-reserpate may be converted into the desired methyl 18-epi-reserpate by treatment with zinc in the presence of aqueous perchloric acid according to the method described in Example 2.

*Example 5*

To a mixture of 0.8 g. of methyl 18-epi-O-methyl-3-iso-reserpate in 16 ml. of acetic acid and 32 ml. of water is added a solution of 0.32 g. of potassium dichromate in 16 ml. of water. After standing at room temperature for one hour, the solution is made basic with aqueous ammonia, the organic material is extracted with methylene chloride, and the organic solution is dried over sodium sulfate and evaporated to dryness. The residue is crystallized from methanol to yield the desired methyl 18-epi - O - methyl-3-dehydro-reserpate, M.P. 226–231°, $[\alpha]_D^{27} = +90°$ (in chloroform).

*Example 6*

A mixture of 0.5 g. of methyl 18-epi-O-methyl-3-dehydro-reserpate, 5 ml. of tetrahydrofuran, 5 ml. of acetone, 4.5 ml. of water, 0.6 ml. of aqueous perchloric acid (of 70–72 percent strength) and 0.5 g. of powdered zinc dust is refluxed under an atmosphere of nitrogen for thirty minutes. After filtering off the solid material, the filtrate is evaporated to dryness, the residue is dissolved in a 1:1-mixture of acetone and water, the acetone is stripped off and the aqueous solution is made basic by adding aqueous ammonia. The organic material is extracted with methylene chloride, the residue from the extract is dissolved in 10 ml. of benzene and placed on a column containing 20 g. of aluminum oxide (neutral, activity II to III). The chromatogram is developed as follows:

| Fractions | Solvents | Eluted Amounts |
| --- | --- | --- |
| 1 | 50 ml. of benzene | no residue. |
| 2 | do | 0.035 g. |
| 3 | do | smear. |
| 4 | 50 ml. of methylene chloride | 0.185 g. |
| 5 | do | 0.080 g. |
| 6 | 100 ml. of methylene chloride, containing 1 percent of methanol. | 0.180 g. |
| 7 | 100 ml. of methylene chloride, containing 5 percent of methanol. | 0.010 g. |
| 8 | 100 ml. of methanol | smear. |

Fraction 6 is crystallized from diethyl ether to yield 0.15 g. of methyl 18-epi-O-methyl-reserpate, M.P. 233–236°, $[\alpha]_D^{26} = -38°$ (in chloroform).

*Example 7*

To a mixture of 0.8 g. of methyl 18-O-methyl-3-iso-reserpate in 16 ml. of acetic acid and 32 ml. of water is added 0.32 g. of potassium dichromate in 16 ml. of water. The reaction mixture is allowed to stand at room temperature and is made basic with aqueous ammonia, whereupon a yellow solid precipitates; the organic material is extracted with methylene chloride, and the extract is dried over sodium sulfate and evaporated to dryness. The desired methyl 18-O-methyl-3-dehydro-reserpate crystallizes from ethyl acetate, M.P. 201–205°, $[\alpha]_D^{27} = +122°$ (chloroform).

*Example 8*

To a solution of 0.75 g. of methyl 18-O-methyl-3-dehydro-reserpate in a mixture of 8 ml. of tetrahydrofuran, 8 ml. of acetone and 7.2 ml. of water are added 0.8 ml. of concentrated perchloric acid of about 70 percent strength and then 0.7 g. of powdered zinc. The mixture is refluxed while constantly stirring for fifteen minutes under an atmosphere of nitrogen, and then evaporated to dryness under reduced pressure. The oily residue is dissolved in 20 ml. of a 3:2-mixture of acetone and water, the solution is made basic with aqueous ammonia and the organic solvent is evaporated off. 25 ml. of water is added, the organic material is extracted with methylene chloride and the organic solution is dried over sodium sulfate and then evaporated to dryness to leave 0.72 g. of a foamy material.

The residue is chromatographed on 20 g. of alumina (Woelm, neutral, activity II to III). The following fractions are collected and each of the fractions subjected to paper chromatography in the system chloroform/formamide to determine the identity of the various fractions:

| Fraction | Solvent | Amount, g. | Rf-value |
| --- | --- | --- | --- |
| 1 | 50 ml. of benzene | 0.200 | 0.15 (trace). 0.83 (trace). 0.90. |
| 2 | do | 0.025 | 0.15 (trace). 0.83. |
| 3 | 50 ml. of methylene chloride | 0.160 | 0.15 (trace). 0.83. |
| 4 | do | 0.080 | 0.83. |
| 5 | do | 0.060 | 0.83. |
| 6 | do | 0.010 | 0.83. |
| 7 | 150 ml. of methylene chloride, containing 0.5 percent of methanol. | 0.160 | 0.83. |
| 8 | 100 ml. of methanol | 0.030 | 0.00 and impurities. |

Fractions 2 to 7, inclusive, are combined and dissolved in a hot 1:3-mixture of benzene and cyclohexane, and the solution is concentrated until crystalline material is formed. A first crop of 0.35 g., representing methyl 18-O-methyl-reserpate, melts at 230–233° and has a rotation of $$[\alpha]_D^{25} = -108°$$

*Example 9*

To a mixture of 2.0 g. of 2-methoxyethyl 18-epi-3-iso-reserpate in 40 ml. of acetic acid and 80 ml. of water is added 0.72 g. of potassium chromate in 40 ml. of water; the reaction mixture is allowed to stand at room temperature for one hour and then worked up as shown in Example 3. The desired 2-methoxyethyl 3-dehydro-18-epi-reserpate melts at 170–174° after crystallization from methanol; $[\alpha]_D^{25} = +125$ (chloroform), and may be converted into the 2-methoxyethyl 18-epi-reserpate according to the procedure described in Example 2.

*Example 10*

A mixture of a solution of 1.0 g. of 2-methoxyethyl 18-epi-O-ethyl-3-iso-reserpate in 20 ml. of acetic acid and 40 ml. of water and 0.4 g. of potassium dichromate in 20 ml. of water is allowed to stand at room temperature for one hour and is then worked up as shown in Example 3. The desired 2-methoxyethyl 18-epi-O-ethyl-3-dehydro-reserpate, obtained as a foam, is used without further purification in the reduction to the 2-methoxyethyl 18-epi-O-ethyl-reserpate according to the procedure of Example 2.

What is claimed is:

1. In the process for the preparation of a compound having as the ring system a member selected from the group consisting of the 1,5,6,15,16,17,18,19,20,21-decahydro-benz[g]indolo[2,3-a]quinolizine ring system having a double bond in the 3(14)-position, and the 5,6,14,15, 16,17,18,19,20,21 - decahydro - 1H - benz[g]indolo[2,3-a]quinolizine ring system having a double bond in the 3(4)-position, the step which comprises reacting at room temperature a member selected from the group consisting of a compound having the 1,3α,5,6,14,15,16,17,18,19, 20,21 - dodecahydro - benz[g]indolo[2,3 - a]quinolizine ring system, and an acid addition salt thereof, with an oxidation reagent containing hexavalent chromium selected from the group consisting of a salt of chromic acid and chromic anhydride, in the presence of an aqueous medium consisting of a mixture of water and a water-miscible organic solvent.

2. Process according to claim 1, which comprises using an alkali metal dichromate as the oxidation reagent.

3. Process according to claim 2, which comprises using potassium dichromate as the oxidation reagent.

4. Process according to claim 1, which comprises carrying out the reaction in the presence of aqueous acetic acid as the mixture of water and a water miscible solvent.

5. In the process for the preparation of a member selected from the group consisting of a $\Delta^{3(14)}$-18-hydroxy-allo-yohimbene 16β-carboxylic acid and a $\Delta^{3(4)}$-18-hydroxy-allo-yohimbene 16β-carboxylic acid and a monoester, a monoether, a diester and a monoester-monoether of such compounds, the step which comprises treating at room temperature a member selected from the group consisting of an 18-hydroxy-allo-yohimbene 16β-carboxylic acid, a monoester, a monoether, a diester and a moneester-monoether thereof, and a salt of such compound, with a salt of chromic acid in the presence of an aqueous medium consisting of water and a water-miscible organic solvent.

6. Process according to claim 5, which comprises using potassium dichromate as a salt of chromic acid.

7. Process according to claim 5, which comprises using aqueous acetic acid as the aqueous medium.

8. Process for the prepartion of a compound having the 1,3β,5,6,14,15,16,17,18,19,20,21 - dodecahydro - benz[g]indolo[2,3-a]quinolizine ring system, which comprises treating at room temperature a member selected from the group consisting of a compound having the 1,3α,5,6,14,15,16,17,18,19,20,21 - dodecahydro - benz[g]indolo[2,3-a]quinolizine ring system, and a salt thereof with an oxidation reagent containing hexavalent chromium selected from the group consisting of a salt of chromic acid and chromic anhydride, in the presence of an aqueous medium consisting of a mixture of water and a water-miscible organic solvent, and reducing in a resulting member selected from the group consisting of a compound having the 1,5,6,15,16,17,18,19,20,21 - decahydro-benz[g]indolo[2,3-a]quinolizine ring system, and a salt thereof, the double bond extending from the 3-position by treatment with zinc in the presence of a member selected from the group consisting of acetic acid, perchloric acid and a mixture of acetic acid and perchloric acid.

9. Process according to claim 8, which comprises using potassium dichromate as the oxidation reagent in the presence of aqueous acetic acid.

References Cited in the file of this patent
UNITED STATES PATENTS 2,977,365   Weisenborn et al. _____ Mar. 28, 1961

OTHER REFERENCES

Theilheimer: Syn. Methods of Org. Chem., volume 9 (1955), page 407.

Wenkert et al.: Jour. Amer. Chem. Soc., volume 79 (1957), pages 1519 and 1520.